No. 874,827. PATENTED DEC. 24, 1907.
W. J. BOTTS.
CHECK ROW AND HILL MARKER.
APPLICATION FILED JUNE 14, 1907.
5 SHEETS—SHEET 3.
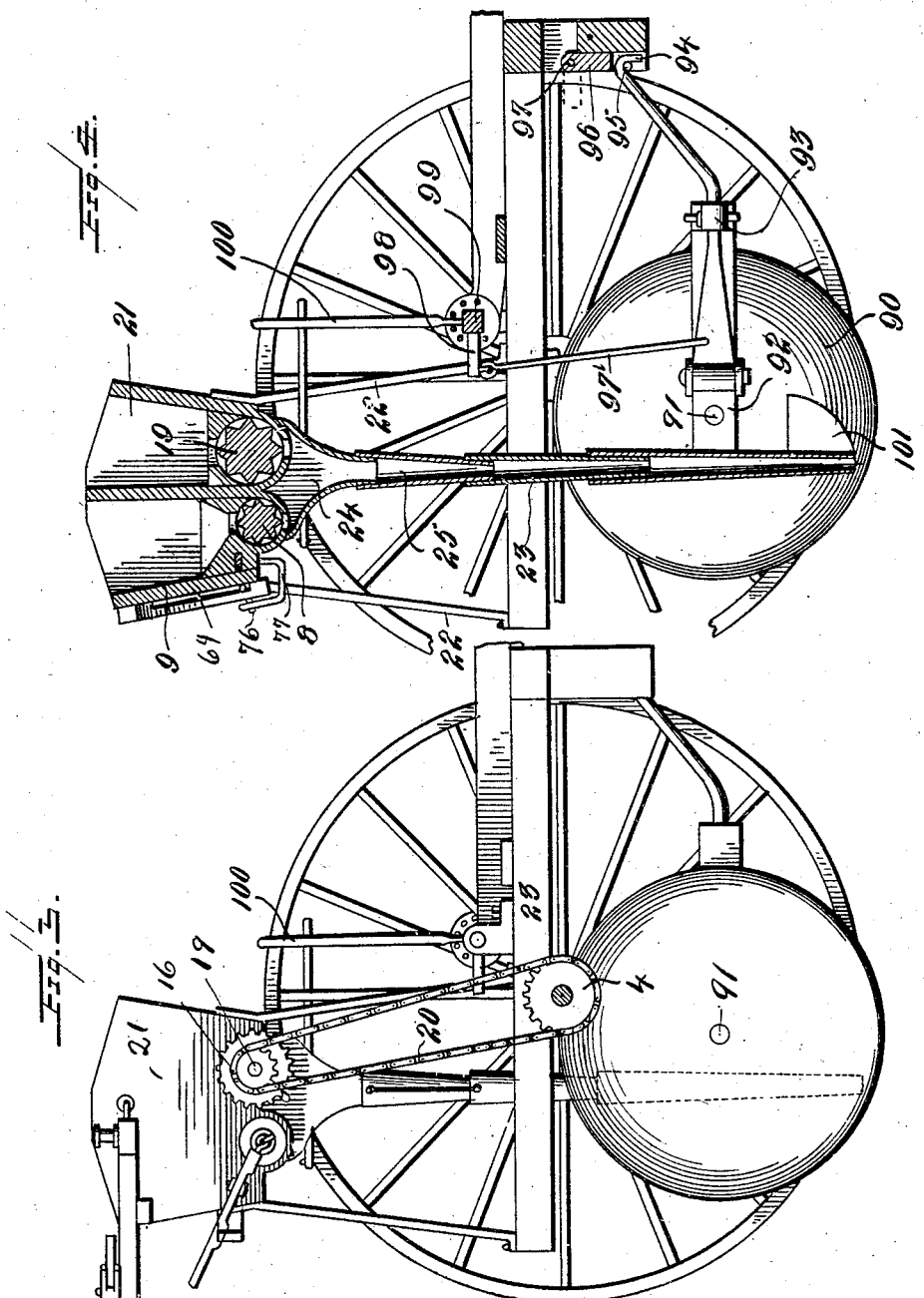
WITNESSES
INVENTOR No. 874,827. PATENTED DEC. 24, 1907.
W. J. BOTTS.
CHECK ROW AND HILL MARKER.
APPLICATION FILED JUNE 14, 1907.
5 SHEETS—SHEET 4.
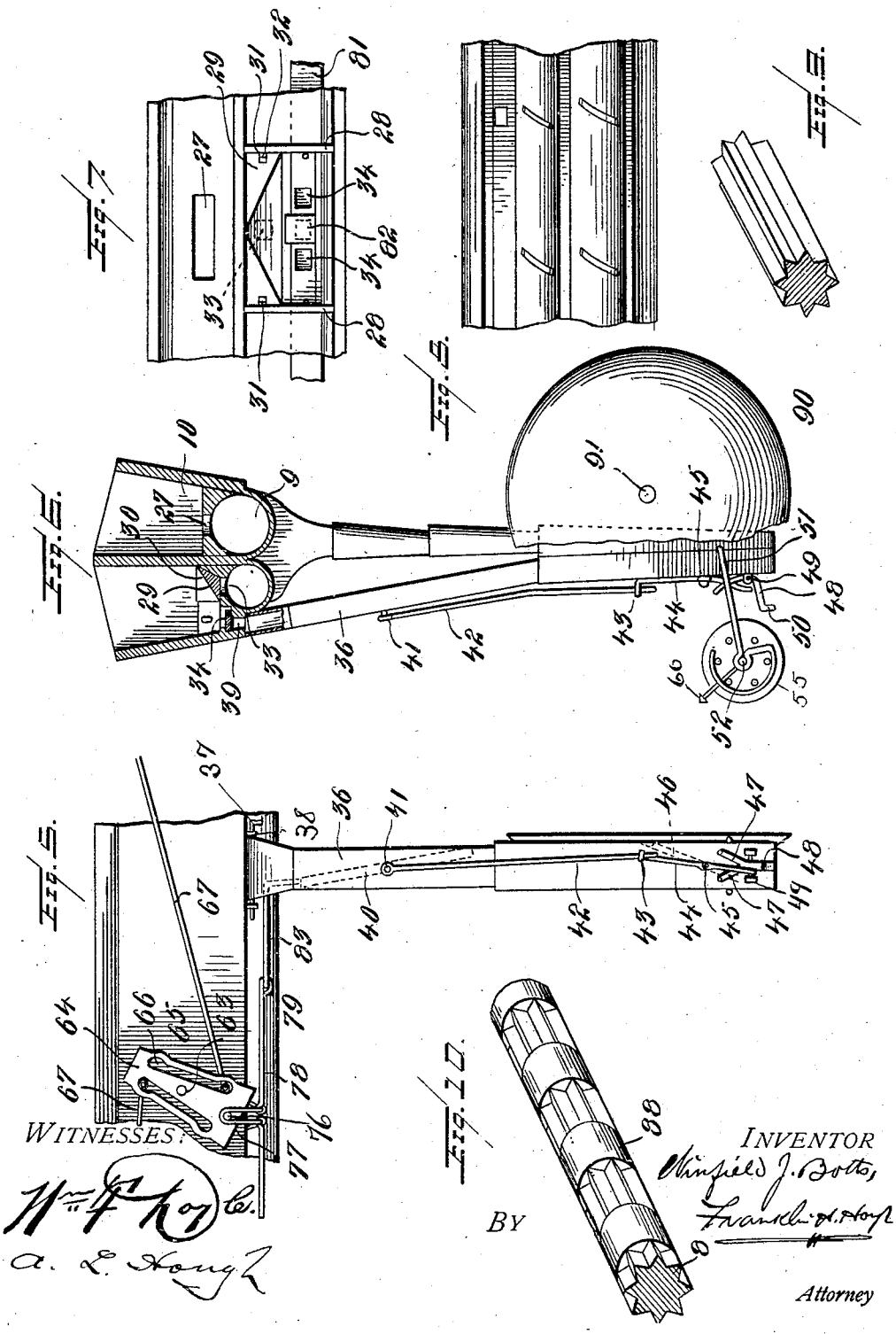

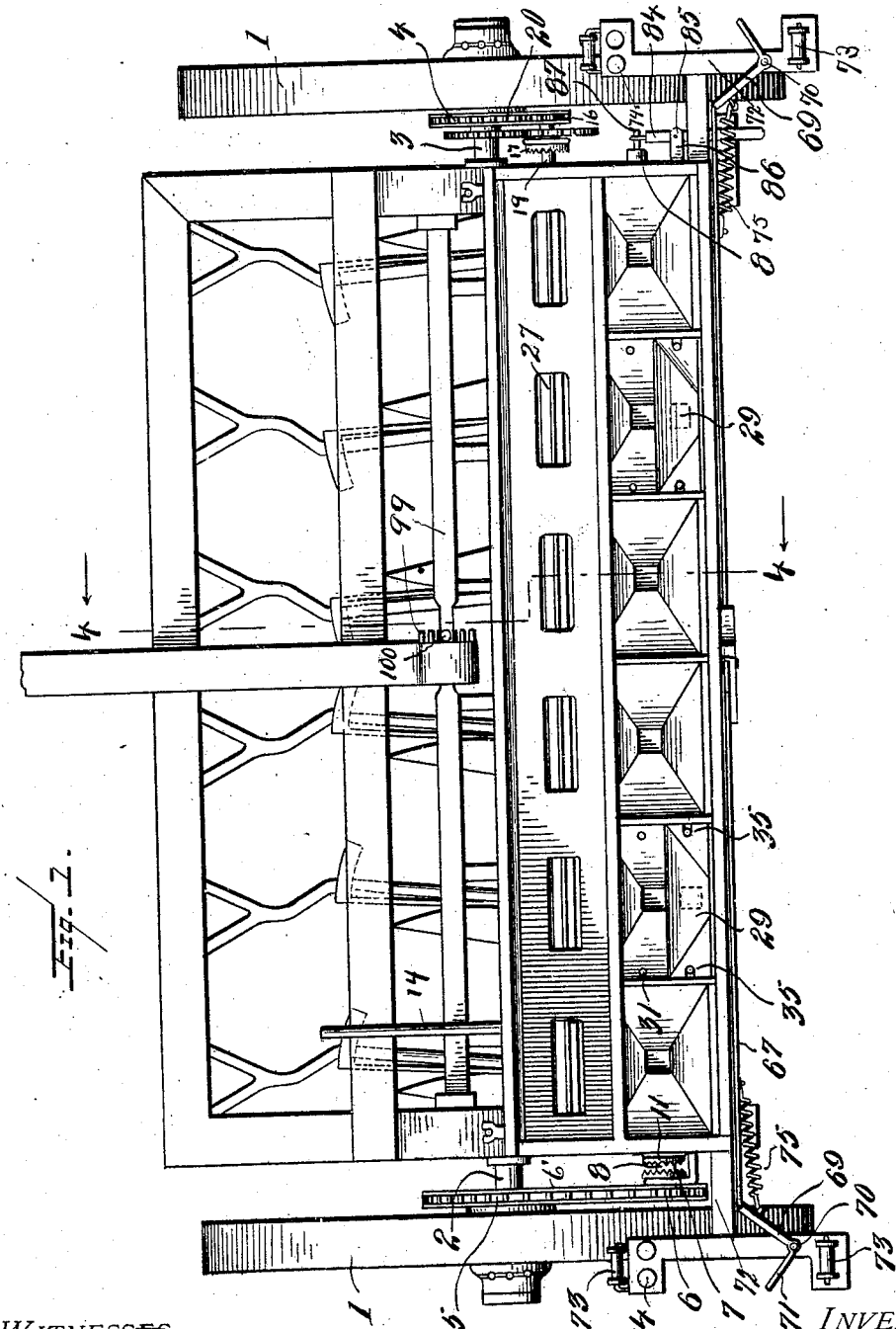

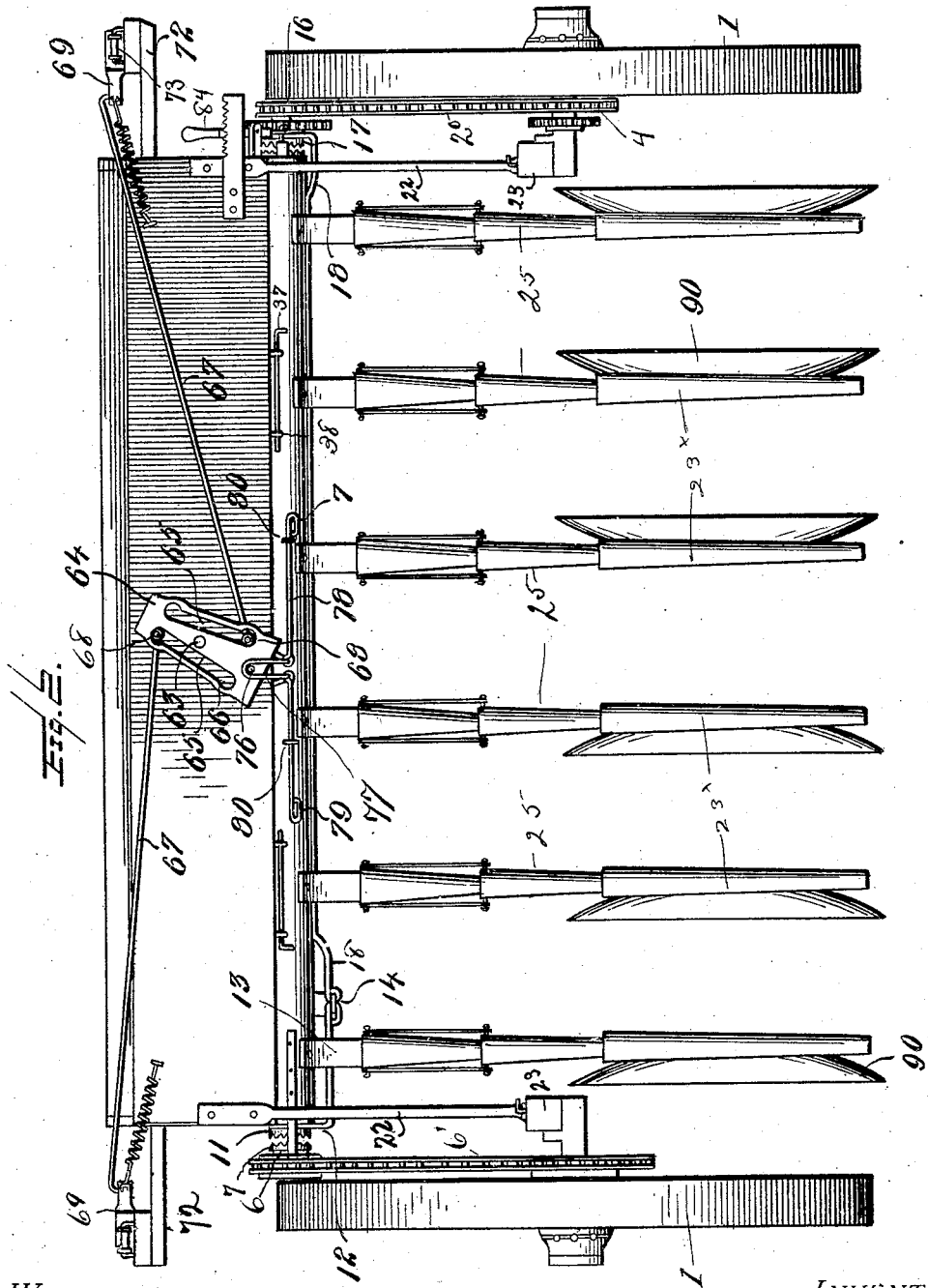

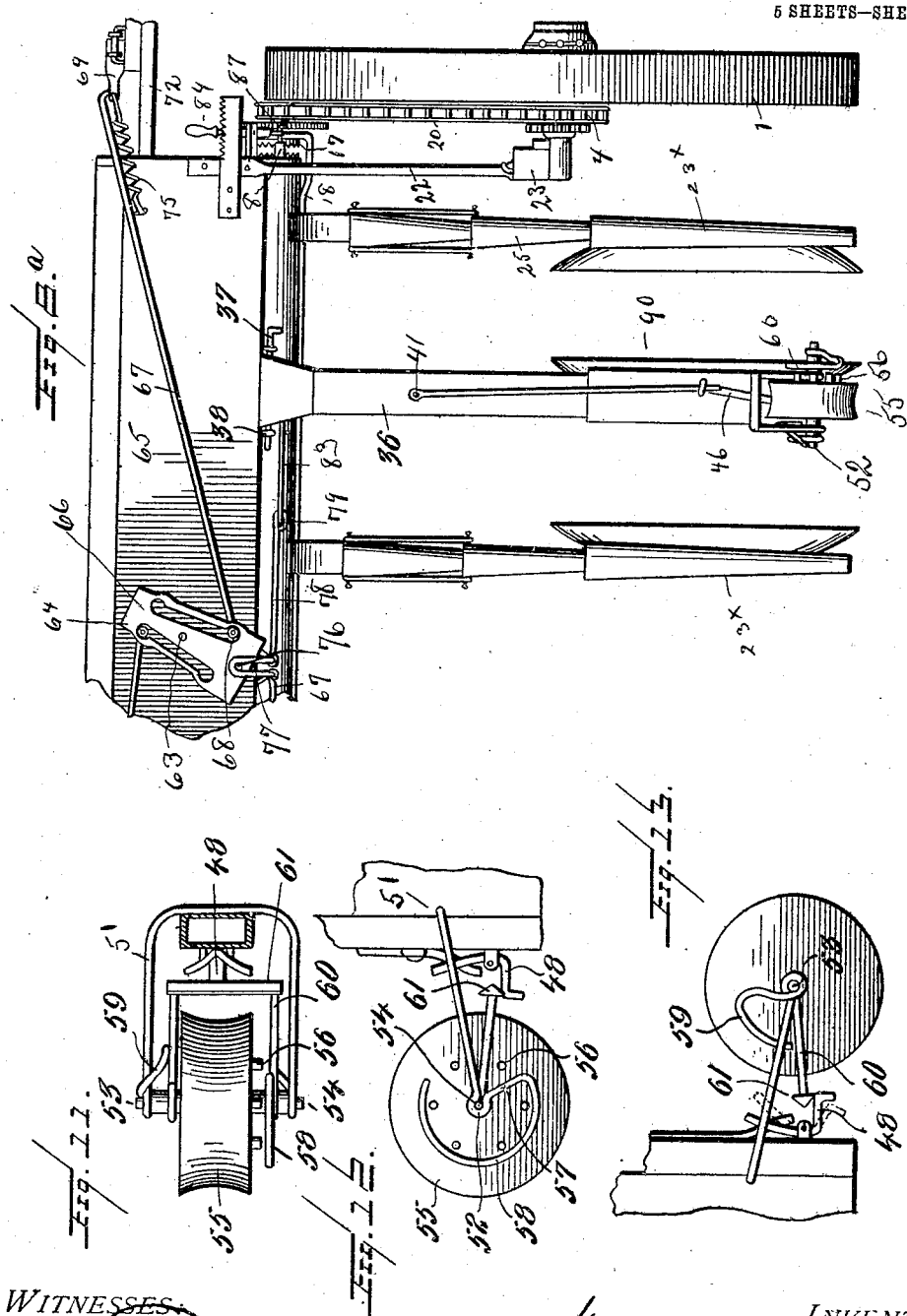

UNITED STATES PATENT OFFICE.

WINFIELD J. BOTTS, OF HAVRE DE GRACE, MARYLAND.

CHECK-ROW AND HILL MARKER.

No. 874,827.　　　Specification of Letters Patent.　　　Patented Dec. 24, 1907.

Application filed June 14, 1907. Serial No. 379,049.

*To all whom it may concern:*

Be it known that I, WINFIELD J. BOTTS, a citizen of the United States, residing at Havre de Grace, in the county of Harford and State of Maryland, have invented certain new and useful Improvements in Check-Row and Hill Markers; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in check row and hill markers, and comprises various details of construction, combinations and arrangements of parts which will be hereinafter fully described and then specifically defined in the appended claims.

I illustrate my invention in the accompanying drawings, which, with the numerals of reference marked thereon, form a part of this application and in which:—

Figure 1 is a top plan view of my invention. Fig. 2 is a rear elevation. Fig. 3 is a side elevation. Fig. 4 is a vertical sectional view centrally through the apparatus. Fig. 5 is a rear elevation of a detail of the apparatus for actuating the valves for dropping the seed. Fig. 6 is a cross sectional view through the seed and fertilizer troughs, connected parts being shown in elevation. Fig. 7 is a top plan view of a portion of the seed and fertilizer troughs. Fig. 8 is a bottom plan view showing the exit apertures of the seed and fertilizer. Fig. 8ᵃ is an elevation of a portion of the rear of the apparatus. Fig. 9 is a detailed view of the rotatable fertilizer feed shaft. Fig. 10 is a detailed view of the seed feeding shaft. Fig. 11 is a top plan view of the marker and coverer wheel. Fig. 12 is a side elevation of the wheel shown in Fig. 11, and Fig. 13 is a side elevation of the opposite side of the wheel shown in Fig. 12.

Reference now being had to the details of the drawings by numerals, 1 designates the driving wheels of the apparatus mounted upon the stub shafts 2 and 3.

4 designates a sprocket wheel which is fixed to the hub of the wheel 1, and 5 designates a sprocket wheel which is fixed to the hub of the wheel mounted upon the stub shaft 2 and is connected by a sprocket chain 6′ with a sprocket wheel 6, which is fixed to a clutch collar 7, which is journaled upon a seed feeding shaft 8 mounted in suitable bearings in the cylindrical portion 9 of the seed trough 10, as shown clearly in Fig. 6 of the drawings.

11 designates a serrated clutch collar which is swiveled upon an arm 12 which has a longitudinal movement in a suitable bearing 13, shown in Fig. 2 of the drawings, and 14 designates a lever, connected to the rods 12 and 18 and pivoted so that as said lever is rocked upon its pivot, the clutch collar 11 may be thrown into or out of mesh with the clutch collar 7.

A sprocket wheel 16, having an integral clutch ring 17, is swiveled in an arm of the rod 18, shown clearly in Fig. 2 of the drawings, said rod 18 being pivotally connected to the lever 14. The teeth of the clutch ring 17 are adapted to engage the teeth upon the end of the fertilizer feeding shaft 19. A sprocket chain 20 passes about the sprocket wheels 4 and 16, whereby a rotary movement may be imparted to the fertilizer feeding shaft, which latter is mounted in a cylindrical outlined portion of the trough 21. Said troughs, which contain the fertilizer and seed, are mounted upon the bracket arms or supports 22 rising from the frame 23 of the apparatus, and 24 is a conductor leading down from the bottom of the two troughs and adapted to receive the seed and fertilizer which may pass together through the spouts 25, a plurality of the latter being shown in the drawings, the one telescoping over the other, and into a boot 23ˣ.

Referring to Figs. 1 and 7 of the drawings will be seen the manner of constructing the bottoms of the seed and fertilizer hoppers, in which 27 designates an elongated slot from which fertilizer is adapted to fall through the trough 10, thence into the conductor beneath. 28 designates partitions transversely across the seed hopper and 29 designates movable blocks, a sectional view of which is shown in Fig. 6 of the drawings, which blocks have beveled surfaces 30 and orifices 31 at the ends thereof adapted to fit over pins 32 to hold the blocks temporarily so as to close the openings 33, one of which is shown in dotted lines in Fig. 7 of the drawings and clearly illustrated in the sectional view in Fig. 6. When the apparatus is adjusted for use in sowing wheat, the blocks 29 are adjusted to the positions shown in Fig. 1 of the drawings, in which positions the apertures 34, illustrated in Fig. 7 of the drawings, are closed and, when the apparatus is adjusted for use in check row planting of corn, the blocks 29 are reversed and held upon the pins 31 instead of upon the pins 35, as shown in Fig. 1 of the drawings. It will be understood that, when the apparatus is adjusted for use in planting corn, the seed is placed only in the compartments in which the removable blocks 29 are positioned, the other compartments intermediate said partitions being left empty.

Referring to Figs. 5, 6 and 8ª of the drawings will be seen spouts 36, the upper portions of which are pivotally mounted upon the pins 37 held in eyes 38 projecting from the lower portion of the seed box or trough. Each of said spouts 36 communicate through an opening 39 with an opening of the seed trough directly underneath the exit apertures 34 through which the corn is allowed to fall. Each spout 36 is provided with a tilting valve 40 mounted upon a pivot pin 41, as shown clearly in Figs. 5 and 6 of the drawings, and fixed to the end of the pivot 41 is a rod 42 which extends down upon the outside of the spout 36 and has pivotal connection with an eye 43 formed on the rod 44, the latter being mounted upon a pivot pin 45 which passes through and has bearings in the walls of the spout 36, and to which pivot pin 45 a damper or valve 46 is fixed. A portion of the rod 44 projects below its pivot 45 and forms a finger having a swinging movement between the arms 47 of the Y-shaped member 48, which is mounted upon a pivot pin 49 supported upon bracket arms fixed to the spout 36. Said member 48 has its lower end bent at an angle as at 50.

51 designates a bail-shaped member which is pivoted upon the spout, the arms of which are bent to form eyes 52 and 53 to form bearings for the shaft 54 fixed to the wheel 55, details of which are shown clearly in Figs. 11 12 and 13. Projecting from one face of the wheel 55 is a series of pins 56 and one arm of said bail-shaped member, after being turned to form an eye 52, is bent slightly at an inclination as at 57 and thence turned to form a semi-cylindrical portion 58 with its end terminating above and slightly at one side of the center of the wheel. The other arm, shown in Figs. 11 and 13 of the drawings, after being bent to form the loop 53, is bent hook-shaped as at 59. 60 designates a marking member which is bail-shaped and provided with a triangular shaped marker head 61 which, as the wheel rotates, is adapted to mark at regular intervals locations for the reception of hills to be planted.

Pivotally mounted upon a pin 63 upon the outer surface of the wall of the seed trough, shown clearly in Figs. 2, and 5 of the drawings, is a plate 64 having two elongated slots 65 formed therein, which are at inclinations to each other, and the end of which slot is slightly enlarged as at 66.

67 designates two rods, each of which carries an anti-friction roller 68, which is adapted to have a movement in a slot 65. The outer ends of said rods 67 are pivotally connected to a lever 69 mounted upon a pivot pin 70, shown clearly in Fig. 1 of the drawings, and the outer end of said lever 69 has forked arms 71 adapted to receive the accustomed balls upon a check line (not shown), whereby the said lever 69 may be rocked upon its pivot to cause seed to be fed from the seed trough.

Projecting from the ends of the seed trough or box are arms 72, the ends of which have lateral projections carrying the anti-friction rollers 73, shown clearly in Fig. 1 of the drawings, and over which a check wire is adapted to travel. Rising vertically from one end of the lateral projection of the arm 72 are the anti-friction rollers 74 spaced apart and adapted to guide a check line. A spring 75 is fastened at one end to the lever 69 and its other end to the seed box, the purpose of which spring is to normally return the rods 67 and the lever 69 to their normal positions after having been tilted by means of a check line and which action of the spring referred to will cause the anti-friction roller 68 carried by the rod 67 to move to the opposite end of the slot in the plate 64.

Projecting from the plate 64 is a pin 76 upon which the inverted U-shaped rod 77 is loosely mounted, the arms of which rod 77 are bent forward horizontally and are pivotally connected to the longitudinal movable rods 78, each of which has an eye 79 formed at its outer end and held by means of eyes 80. The inner ends of the rod 77, which is mounted upon the pin 76, extend upwardly and engage a cut-off plate 81, which is apertured and mounted to slide underneath the openings in the bottoms of the seed trough. 82 designate guide blocks which are recessed on their under surfaces and serve as means to guide the plate 81 in its longitudinal movements. A rod 83 is pivotally connected to each eye 79, as shown in Fig. 5 of the drawings, and each rod 83 passes through an aperture in the wall of the spout 36 and is fastened to the upper end of the valve or damper 40 whereby, as a longitudinal movement is imparted to the bar 83, said valve or damper is rocked on its pivot 41, which in turn will cause the rod 42 to swing and in turn tilt the valve or damper 46 in a reverse direction from the tilting movement of the valve or damper 40.

Referring to Fig. 1 of the drawings will be seen a lever 84 pivotally mounted upon a pin 85 carried by the bracket arm 86 and the inner end of said lever is swiveled to a pin 87 projecting from one end of the seed feeding shaft 8.

Upon reference to the detail view of Fig. 10 of the drawings, it will be seen that the seed feeding shaft 8 is divided into a series of compartments by the partition 88 and, by moving the shaft longitudinally, more or less seed may be fed into the radial grooves in the circumference of said shaft.

Suitable harrow disks 90 are mounted adjacent to and in advance of the conducting tube, each being mounted upon a stub shaft 91, the ends of which are supported in the arms 92 of the drag bars 93, the inner ends of the arms being angled as at 94 and adapted to engage over the horizontally disposed rod 95, which is fastened to a cross piece in the frame of the apparatus.

96 designates a swinging bar pivotally mounted at its end upon the pins 97, said bar 96 being adapted to swing to a horizontal position, as shown in Fig. 4 of the drawings, in order to allow the inner ends of the drag bar 93 to hook over the rod 95. By this arrangement, it will be noted that the drag bars which carry the harrow disks may be easily detached and replaced when desired. Rods 97' are connected at their lower ends to the drag bar 93 and their upper ends are pivotally connected to fingers 98 which project from the rock shaft 99 to which a lever 100 is connected, thereby forming means whereby, as the shaft 99 is rocked, said drag bar carrying the harrow disks may be raised and lowered. Fixed to each disk is a plow furrow opener 101 serving as a means to form a furrow in which the seed and fertilizer are adapted to fall.

When the apparatus is to be adjusted for use in making hills and marking for plants, the apparatus appears as shown in Fig. 8ª of the drawings, in which the two outer harrow disks are reversed or the concaved sides made to face each other so that they will, as the machine moves over the ground, cause the soil to hill up, the marker traveling over the portion that has been hilled marking at each revolution the location for a plant.

In operation, when the device is adapted for use as a check row planter, the blocks 29 are positioned over the openings 33, as shown in Fig. 7 of the drawings, and a check line is passed over the anti-friction rollers upon the lateral projections of the arm which extends from the ends of the box, at which time a ball or button of a check line actuates the angle lever 69 and a longitudinal movement will be imparted through a lever 67 to the plate 64, causing the same to oscillate. As said plate oscillates, the inverted U-shaped rod 77 will be moved laterally and the inner ends of the latter, which extend up through underneath the trough and engage the apertured slide or bar 81, will cause a longitudinal movement to be imparted to the latter whereby the seed may be fed from the trough into the spouts leading down to the ground. A rotary movement is imparted to the fertilizer feeding shaft as the apparatus moves over the ground, thereby causing fertilizer to be fed through the exit openings in the bottom of the fertilizer box or trough. As the slide 81 is driven, a vibratory movement through the rods 78 and 83 will be imparted to the damper or valve 40 allowing any seed which may be held between the valve and the wall of the spout in which it is located to fall to the lower portion of the spout and be caught by the valve 46, which, when the valve 40 tilts in the opposite direction, will discharge the seed and allow the same to fall to the ground. By this arrangement of the two valves 40 and 46, it will be noted that the valves will first discharge from one side and then from the other of the two valves as they vibrate alternately.

When the device is utilized for planting wheat in which the check row apparatus is dispensed with, the blocks 29 are positioned as shown in Fig. 1 of the drawings and the spouts 36 and attachments may be removed from the apparatus, allowing the wheat or other grain to be fed by the rotary shaft in the lower portion of the seed trough through the spouts where it mixes with the fertilizer as it reaches the ground. By moving longitudinally the seed feeding shaft 8, the quantity of seed being fed may be regulated, as will be understood.

When utilizing the apparatus for making a ridge and marking locations for setting out plants, the form of apparatus illustrated in Figs. 8ª, 11, 12 and 13 are employed, in which the outer of the harrow disks are shown in reverse order, whereby a slight mound of soil may be thrown up as the apparatus passes over the ground and, at each revolution of the marking wheel 55, the angled marker 61 will make a groove in the surface of the ground. As the wheel 55, which is driven by its frictional contact with the ground, is caused to rotate, the bail-shaped member carrying the marker will be caused to rotate with the wheel by the arms of the bail coming in contact with one of the pins upon the face of the wheel. When the marker comes against the outwardly projecting end of the tilting member 48, its further progress will be arrested and, in order to throw the arm of the bail out of the path of the pin which has driven it forward, the curved end 59, shown in Fig. 11, which is positioned in the path of the other arm of the bail will cause the latter to be pushed into the position shown in Fig. 11, thereby allowing the wheel to turn freely until the obstruction 48 allows the marker to pass by the same. As the member 48 is tilted by means of the check row mechanism, the marker 61 will proceed to rotate with the wheel 55, the inclined portion 57 of the rod serving to throw the bail back into its normal position, so that it will be caught by one of said pins and caused to rotate with the wheel.

By the provision of the means shown and described, simple and efficient mechanism is afforded for detachably connecting the racks carrying the harrow drag bars, thereby enabling the machine to be readily adjusted for the various purposes for which it is applicable.

What I claim to be new is:

1. A combination check row planter, comprising a frame, driving wheels and harrow disks mounted thereon, a seed trough, a spout leading from the trough, valves mounted in the spouts, a rod connecting the valves and adapted to tilt the same simultaneously in opposite directions, a slide adapted to regulate the feed of the seed, a slotted plate pivotally mounted upon the seed trough, rods having sliding pivotal connection with said plate, and check row actuated mechanism for moving said rods whereby the plate may be tilted, as set forth.

2. A combination check row planter, comprising a frame, driving wheels and harrow disks mounted thereon, a seed trough, spouts leading from the trough, valves mounted in the spouts, a rod connecting the valves and adapted to tilt the same simultaneously in opposite directions, a slide adapted to regulate the feed of the seed, a slotted plate pivotally mounted upon the seed trough, said plate having slots therein, rods with anti-friction rollers mounted thereon and which latter are mounted in said slots, and check row actuated mechanism for operating said rods, as set forth.

3. A combination check row planter, comprising a frame, driving wheels and harrow disks mounted thereon, a seed trough, spouts leading from the trough, valves mounted in the spouts a rod connecting the valves and adapted to tilt the same simultaneously in opposite directions, a slide adapted to regulate the feed of the seed, a slotted plate pivotally mounted upon the seed trough, said plate having slots therein, rods with anti-friction rollers mounted thereon and which latter are mounted in said slots, check row actuated mechanism for operating said rods, and means adapted to move said anti-friction rollers from one end of the slot to the other after the plate has been tilted by the check row mechanism, as set forth.

4. A combination check row planter, comprising a frame, driving wheels and harrow disks mounted thereon, a seed trough, spouts leading from the trough, valves mounted in the spouts, a rod connecting the valves and adapted to tilt the same simultaneously in opposite directions, a slide adapted to regulate the feed of the seed, a plate pivotally mounted upon the seed trough, said plate having slots therein, the ends of said slots being enlarged, anti-friction rollers adapted to move in said slots, rods, said anti-friction rollers mounted on the latter and positioned in said slots, check row mechanism for moving said rods whereby said plate may be tilted, and means for moving the anti-friction rollers from one end of the slots to the other after the plate has been tilted, as set forth.

5. A combination check row planter, comprising a frame, driving wheels and harrow disks mounted thereon, a seed trough, spouts leading from the trough, valves mounted in the spouts, a rod connecting the valves and adapted to tilt the same simultaneously in opposite directions, a slide adapted to regulate the feed of the seed, a plate pivotally mounted upon the seed trough, said plate having slots therein, the ends of said slots being enlarged, anti-friction rollers adapted to move in said slots, rods connected to said anti-friction rollers, check row mechanism for moving said rods whereby said plate may be tilted, tilting check row operated levers to which said rods are connected, springs connected to said tilting levers and fastened to the seed box or trough, as set forth.

6. A combination check row planter, comprising a frame, driving wheels and harrow disks mounted thereon, a seed trough, an apertured slide adapted to regulate the feed of the seed, spouts leading from said trough, valves mounted on central pivots within the spouts and adapted to move simultaneously in opposite directions, a plate pivotally mounted upon the seed trough, check row actuating means for tilting said plate, and connections between said slide and plate and between the latter and said valves, as set forth.

7. A combination check row planter, comprising a frame, driving wheels and harrow disks mounted thereon, a seed trough, an apertured slide adapted to regulate the feed of the seed, spouts leading from said trough, valves mounted on central pivots within the spouts and adapted to move simultaneously in opposite directions, a plate pivotally mounted upon the seed trough, check row actuating means for tilting said plate, a rod pivotally mounted upon said plate and having angled arms fixed to said slide, pivotal link connections between said slide and one of said valves, as set forth.

8. A combination check row planter, comprising a frame, driving wheels and harrow disks mounted thereon, a seed trough, an apertured slide adapted to regulate the feed of the seed, spouts leading from said trough, valves mounted on central pivots within the spouts and adapted to move simultaneously in opposite directions, a plate pivotally mounted upon the seed trough, check row actuating means for tilting said plate, a rod pivotally mounted upon said plate and having angled arms fixed to said slide, pivotal link connections between said slide and one of said valves, rods fixed to the pivots of said valves and having pivotal connection with each other, as set forth.

9. A combination check row planter, comprising a frame, driving wheels and harrow disks mounted thereon, a seed trough, an apertured slide adapted to regulate the feed of the seed, spouts leading from said trough, valves mounted on central pivots within the spouts and adapted to move simultaneously in opposite directions, a plate pivotally mounted upon the seed trough, check row actuating means for tilting said plate, a pin projecting from said plate, an inverted U-shaped rod having pivotal connection with said pin, the arms of said rod being angled and upwardly bent to engage said slide, links pivotally connected to said inverted U-shaped rod, angled levers pivotally connected to said links and extending through the walls of the spouts, each angle lever fixed to a valve and connections between the latter, as set forth.

10. A combination check row planter, comprising a frame, driving wheels and harrow disks mounted thereon, a seed trough, said seed trough having a series of feeding apertures therein, an apertured slide in the seed trough, adjustable blocks adapted to close one series or the other of said apertures, spouts leading from the trough, reversely movable valves mounted in said spouts, and check row mechanism for actuating said slide and valves, as set forth.

In testimony whereof I hereunto affix my signature in the presence of two witnesses.

WINFIELD J. BOTTS.

Witnesses:
A. L. HOUGH,
ROBERT A. BOSWELL.